United States Patent
Dendis et al.

(10) Patent No.: US 9,643,645 B2
(45) Date of Patent: May 9, 2017

(54) BALL STUD SYSTEM FOR USE WITHIN A BALL JOINT

(75) Inventors: Christopher Dendis, Plain City, OH (US); Lixin Chen, Powell, OH (US); Lars David Moravy, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1416 days.

(21) Appl. No.: 11/874,450

(22) Filed: Oct. 18, 2007

(65) Prior Publication Data

US 2009/0103974 A1 Apr. 23, 2009

(51) Int. Cl.
*F16C 11/00* (2006.01)
*B62D 7/18* (2006.01)
*F16B 9/02* (2006.01)
*F16B 39/04* (2006.01)

(52) U.S. Cl.
CPC .............. *B62D 7/18* (2013.01); *F16B 9/026* (2013.01); *F16B 39/04* (2013.01); *Y10T 403/32614* (2015.01); *Y10T 403/32737* (2015.01)

(58) Field of Classification Search
CPC Y10T 1403/32614; Y10T 1403/32737; B62D 7/18; F16B 9/026; F16B 39/04
USPC ............ 403/13, 14, 122–144, 409.1; 280/93, 280/511, 93.503, 93.508, 93.511; 411/280, 315–320
See application file for complete search history.

(56) References Cited

U.S. PATENT DOCUMENTS

| | | | | |
|---|---|---|---|---|
| 1,854,938 A * | 4/1932 | Jantsch | | 403/75 |
| 2,083,718 A * | 6/1937 | Kull et. al. | | 403/37 |
| 2,908,507 A * | 10/1959 | Blanks, Sr. et al. | | 280/93.511 |
| 2,933,336 A * | 4/1960 | Pritchard et al. | | 403/75 |
| 4,162,859 A * | 7/1979 | McAfee | | 403/75 |
| 4,957,403 A * | 9/1990 | Corain et al. | | 411/368 |
| 5,927,918 A * | 7/1999 | Burger | | 411/10 |
| 6,309,220 B1 * | 10/2001 | Gittleman | | 433/173 |
| 6,527,468 B1 * | 3/2003 | Lindquist et al. | | 403/122 |
| 6,533,490 B2 * | 3/2003 | Kincaid et al. | | 403/133 |
| 6,644,883 B2 * | 11/2003 | Davis | | 403/122 |
| 6,783,136 B2 * | 8/2004 | Pronsias Timoney et al. | | 280/93.511 |
| 6,811,345 B2 * | 11/2004 | Jackson | | 403/122 |
| 6,834,863 B2 * | 12/2004 | Urbach | | 277/635 |
| 6,851,688 B2 * | 2/2005 | Barry | | 280/93.51 |

* cited by examiner

*Primary Examiner* — Michael P Ferguson
*Assistant Examiner* — Nahid Amiri
(74) *Attorney, Agent, or Firm* — Rankin, Hill & Clark LLP

(57) ABSTRACT

A ball stud system that provides a ball stud that will not loosen easily under the application of repetitive side loading on the ball portion of the stud. The ball stud is secured to the vehicle steering knuckle arm using the combination of a tapered nut and tapered washer. The tapered nut includes slots and the pin of the ball stud an aperture. A cotter pin may be placed through the slots and aperture in order to further prevent rotation of the nut.

10 Claims, 2 Drawing Sheets

BALL STUD SYSTEM FOR USE WITHIN A BALL JOINT

BACKGROUND OF THE INVENTION

Ball joints have been used for years within automobiles, particularly within automobile suspensions. As an example, a typical ball joint operatively connects a control arm to a steering knuckle within the automobile's steering system. The ball joint includes a ball stud and a socket. The ball stud gets attached to the steering knuckle. A pin portion of the ball stud is usually tapered in some manner and fits into a matching tapered hole in the steering knuckle. A distal end of the pin is typically threaded and a nut is attached thereto in order to hold the pin within the steering knuckle. The socket gets attached to the control arm. The socket fits over a spherical ball portion of the ball stud and permits relative universal rotation between the steering knuckle and control arm. Ball joints are also used in other areas of vehicle suspensions.

In existing practice, many types of ball stud designs are used, including a small taper pin design and a large taper pin design. Taper angle is defined as the angle between the center line of the length of the stud and the tapered surface of the stud or washer used in combination with the stud. In the small taper design, the pin of the stud, where it fits into the steering knuckle has a slight, but consistent taper generally along its entire length. The stud is held in place using a nut with a flat bottom that fits against a flat face of the steering knuckle. When side loads are applied to the ball of the stud however, the tapered portion sinks deeper into the steering knuckle (as a result of friction and yielding of the material of the steering knuckle) as compared to its original position. This sinking results in a loss of torque in the nut that holds the stud in place. Once a certain amount of torque loss occurs, the joint is considered to have failed. In an extreme situation the nut will loosen to a point that it begins to rotate off of the stud.

In a large taper design, a tapered washer is used in combination with a pin of generally consistent diameter. The tapered washer has a more severe taper that the pin within the small taper pin design, but the washer does not extend significantly into the steering knuckle. A common flat nut is again used on the opposite side of the steering knuckle in combination with the tapered washer. However, when a side load is applied at the center of the ball, the nut has a tendency to slip laterally along the flat face of the steering knuckle which it abuts. Due to this slipping motion, the nut has a tendency to loosen, and thus fail the joint again, and does not provide a superior connection to the steering knuckle.

What is desired is a ball stud system wherein when mounted, and a side load is applied to the ball of the ball stud, the nut holding the stud in place will not lose torque or loosen.

BRIEF SUMMARY OF THE INVENTION

This object is achieved by the device of the present invention.

The ball stud system of the present invention provides a ball stud that will not fail or loosen easily under the application of repetitive side loading on the ball portion of the ball stud. The ball stud is secured to a vehicle's steering knuckle or other suspension component using the combination of a tapered nut and tapered washer. The tapered nut includes slots and the pin of the ball stud an aperture. A cotter pin may additionally be placed through the slots and aperture in order to further prevent rotation of the nut.

The present invention provides many benefits over the prior art. Because, under side loads, relative movement between the ball stud and suspension component is minimized, there is very little sinking of the ball stud into the suspension component. As a result the relative geometry of parts within the suspension, which is important to proper operation, is maintained.

The ball stud system of the present invention is easier to disassemble than a small taper pin design which requires special tools. The small taper ball stud will self lock inside the tapered hole by friction. In this instance, once the securing nut is removed, a special tool must be used to press the stud out of the tapered hole. Such a tool is not required with the present invention.

The ball stud of the present invention can be secured to a suspension component that is made of a relatively soft material, such as aluminum, because less surface contact pressure is required between the ball stud and the suspension component. The clamping load is generated by a combination of normal force (force applied perpendicular to the stud or taper surface and creates surface contact pressure) and friction force. The friction force is a fraction of the normal force and acts in a direction along the taper surface. In a small taper joint, friction force carries most of the clamp load. Normal force balances the clamp load. The same clamp load generates far less surface contact pressure in large taper joints than in small taper joints.

The ball stud system of the present invention also provides a better sealing structure for the ball socket area as the seal used therein rests on a large tapered washer. The tapered washer is attached to the stud and seal prior to assembly with the suspension component (e.g. steering knuckle), whereas in a device not using such a washer, the seal connection is made with the vehicle component upon assembly. In addition, the washer surface is typically better machined than the vehicle component (e.g. steering knuckle) surface, thus, allowing the formation of a better seal.

These and other aspects of the invention are herein described in particularized detail with reference to the accompanying figures.

BRIEF DESCRIPTION OF THE DRAWINGS

The invention is explained in more detail by way of the subsequent Figures, wherein.

DETAILED DESCRIPTION OF THE PREFERRED EMBODIMENTS

Figure 1:
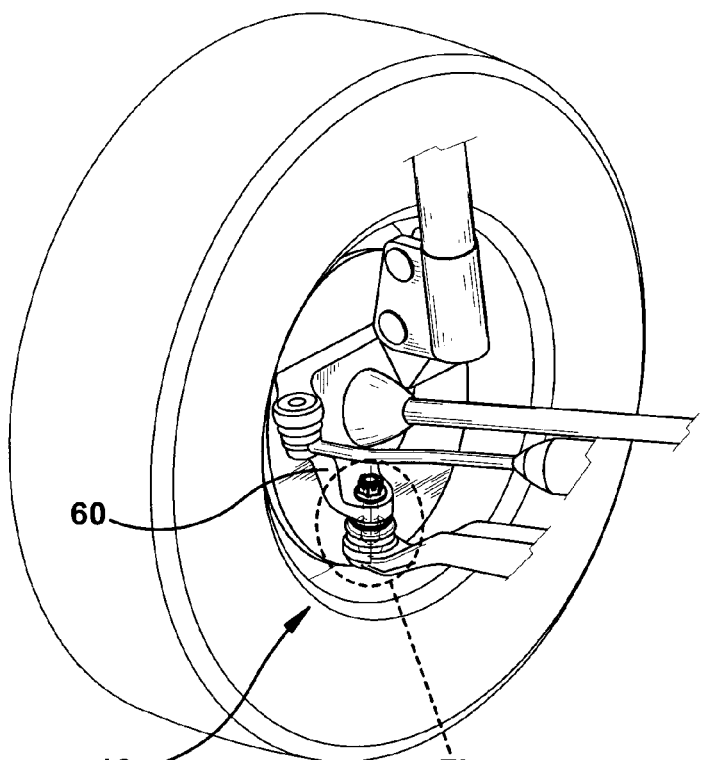
FIG. 1 shows a perspective view of a vehicle suspension system including a ball stud system according to the invention.

Schematically, and in a very simplified manner, FIGS. 1-4 show an exemplary embodiment of a ball stud system 10 according to the present invention for use within a vehicle ball joint 12. The ball stud 14 is not easily loosened during normal operation of the vehicle, i.e. torque within the nut securing the ball stud in place is not lost easily. The ball stud system 10 includes a ball stud 14, tapered washer 16 and tapered nut 18.

Figures 3, 4:
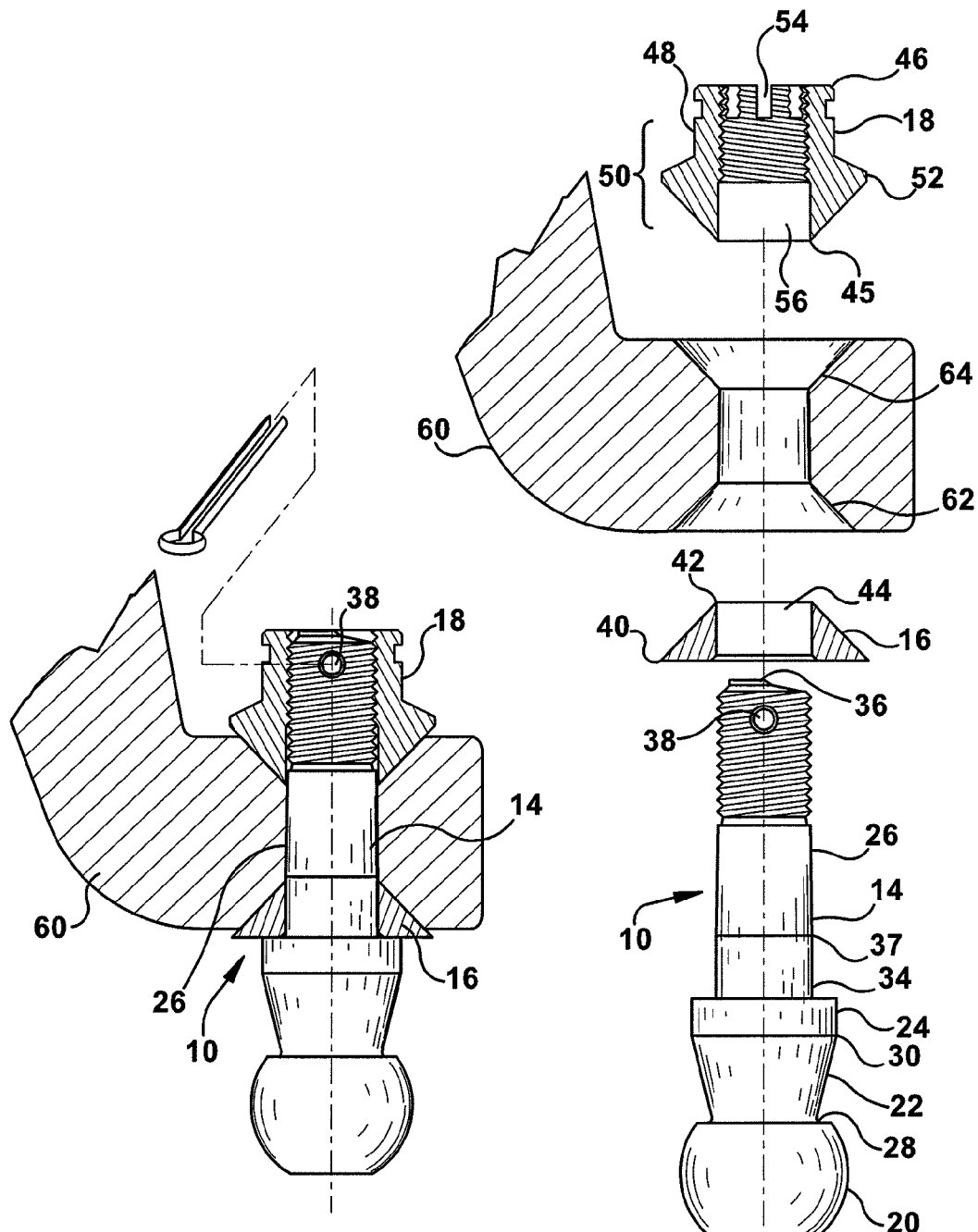
FIG. 3 shows a cross sectional view of the ball stud system attached to the vehicle suspension component.
FIG. 4 shows an exploded view of the ball stud system of the ball joint as well as a portion of the vehicle suspension component.

Referring to FIG. 4, the ball stud 14 is preferably formed from steel and includes, from the bottom up, a ball 20, a tapered neck 22, a shoulder 24, and a pin 26, all integrally formed. The preferred material of construction for the washer 16 and nut 18 is also steel. The ball 20 has a known generally spherical shape which merges at its top into an adjacent neck 22. At the bottom of the ball 20, the spherical shape, preferably, is truncated. The neck 22 is a truncated cone with a proximal end 28, adjacent the ball 20, having a smaller diameter than the distal end 30 opposite the ball 20. The shoulder 24 is located adjacent to the distal end 30 of the neck 22 and is shorter than the neck 22. The shoulder 24 has a generally unchanging diameter along its height. This diameter is generally equivalent to the largest diameter of the neck 22.

The pin 26 of the ball stud 14 is adjacent to the shoulder 24 and includes a proximal end 34 and a distal end 36. Along its length, the pin 26 has, in general, a consistent diameter. The pin 26 is threaded from its distal end 36 to approximately the halfway point of the pin's length. From the threaded portion to a point 37 that is about one third of the length of the non-threaded section from the shoulder, the pin has a diameter that is approximately equivalent to that of the outer radius of the threads. From this point 37 to the shoulder 24, the pin 26 has a slightly larger diameter. The surface of the non-threaded portion of the pin 26 is generally smooth. Adjacent to the distal end 36, an aperture 38 passes through the entire thickness of the pin 26.

The tapered washer 16 includes a proximal end 40 and a distal end 42 and tapers linearly from the proximal end 40 to the distal end 42. When in place within the ball stud system 10, the proximal end 40 of the tapered washer 16 has a greater diameter than the distal end 42. An aperture 44 passes axially through the center of the tapered washer 16. The aperture 44 is countersunk slightly at the proximal end 40 of the washer 16. The countersink provides clearance between the washer 16 and ball stud 14 in the fillet area where the stud shape changes from large diameter to small diameter.

The tapered nut 18 also includes a proximal end 45 and a distal end 46, with flats 48 of the nut located adjacent the distal end 46. A middle section 50 is located therebetween. The nut 18 tapers outwardly from the proximal end 45 into the middle section 50. The taper is linear. After reaching a point of greatest diameter 52 within the middle section 50, the tapered nut 18 then tapers inwardly until reaching the flats 48 on the tapered nut 18. The flats 48 are of a type known in the art, namely six flat portions around the circumference of the nut 18. The flats 48 are provided with vertical notches 54. The notches 54 are located at the center of each flat 48 and extend from the distal end 46 of the nut 18 downward to a point approximately half way along the height of the flat 48. The nut 18 includes an aperture 56 passing axially through the center of the nut 18. Approximately, two thirds of nut adjacent to the aperture 56 is threaded, beginning at the distal end 46. This amount of threading allows the nut 18 to be effectively secured to the ball stud 14, but does not significantly reduce the stretch length of the ball stud 14. A significant reduction in the ball stud's stretch length would make the ball stud more susceptible to allowing a reduction of torque in the nut 18 when side forces were applied to the ball stud 14.

Referring to FIGS. 1-4, the vehicle includes a mount 60 that is preferably the steering knuckle, but may be any vehicle component if the ball stud system 10 is used elsewhere within the suspension or another part of the vehicle.

Referring to FIGS. 3 and 4, the tapered washer 16 is placed over and around the pin 26 of the ball stud 14 and moved downwards until the tapered washer 16 rests on the shoulder 24 of the ball stud 14. The washer 16 surrounds the non-threaded portion of the pin 26 having a slightly larger diameter. The ball stud 14 is then moved into place on the mount 60. The tapered portion of the washer 16 fits into a mating tapered portion 62 formed in the mount 60. A portion of the tapered washer 16 does not fully fit into the mount 60, but protrudes slightly at the proximal end 40 of the tapered washer. The tapered nut 18 is then threaded onto the threaded portion of the pin 26. The tapered portion of the tapered nut 18 fits into a mating tapered portion 64 formed in the mount 60. A portion of the tapered nut 18 does not fully fit into the mount 60, but protrudes slightly at the point of greatest diameter 52 of the tapered washer.

The loading capacity of the ball joint determines the size of the nut and washer as well as the taper angle of each and how far they penetrate into the mount.

Figure 2:
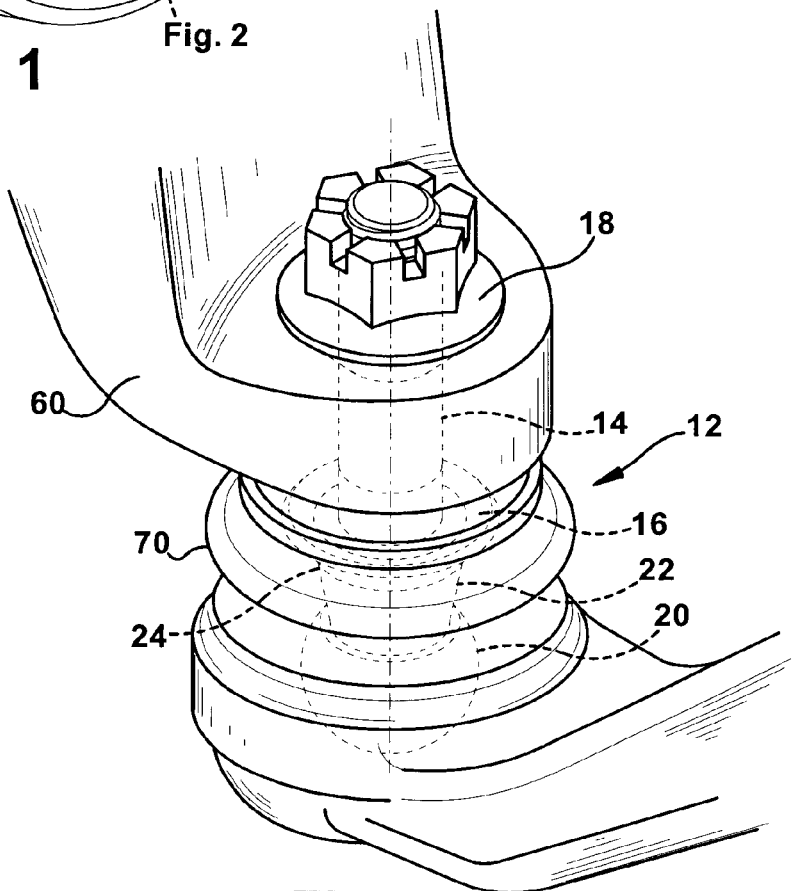
FIG. 2 shows a close up view of the ball stud system (mostly in phantom lines) within a ball joint in the vehicle suspension system.

Referring to FIG. 2, the ball portion 20 of the ball stud 14 functions as a normal ball, as is known in ball joints within the art, namely a socket 70 mates with the ball 20 in such a way that universal directional movement is provided between the ball 20 and socket 70. The neck 22 of the ball stud 14 spaces the socket 70 which fits over the ball 20 from the mount 60 into which the pin 26 fits. The shoulder 24 of the ball stud 14 provides a seat for the proximal end of the tapered washer 16. Force is transferred through the ball stud 14 to the tapered washer 16.

Referring to FIGS. 2 and 3, the pin 26 acts as a means for securing elements on both sides of the mount 60 (for example, a steering knuckle). The aperture 38 within the distal end of the pin 26 permits a cotter pin or the equivalent to be placed therethrough. The tapered nut 18 secures the ball stud 14 in place. The nut is tightened until an appropriate torque is measured. The cotter pin engages the slots 54 within the tapered nut 18 to act as an additional means of preventing unwanted rotation of the tapered nut 18.

As opposed to the generally spherical shape of the ball 20, other known shapes may be used such as a truncated cone. The neck 22 may be straight as opposed to being frustoconical. The slots may also be omitted from the tapered nut.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A vehicle ball joint's ball stud system wherein a ball stud is securable to a mount having two tapered portions, the ball stud system comprising:
   a ball stud having a ball portion, shoulder portion and pin portion, structurally distinct from one another, wherein the pin portion is at least partially threaded and has a generally constant outer diameter;
   a selectively removable tapered washer that is in contact with and fits around the pin portion, and is supported on the shoulder portion of the ball stud, and is capable of fitting within a first tapered portion of a mount;

a tapered nut that is capable of fitting into a second tapered portion of a mount and threadingly engages threads on said pin portion to secure said ball stud to the mount.

2. The ball stud system of claim 1, wherein the ball stud further includes a tapered neck located between the ball portion and shoulder portion.

3. The ball stud system of claim 1, wherein the at least partially threaded part of the pin portion further comprises an aperture passing radially therethrough for receiving a cotter pin.

4. The ball stud system of claim 3, wherein the tapered nut includes flats that have slots therein to receive a cotter pin.

5. The ball stud system of claim 1, wherein when assembled the tapered washer and tapered nut protrude slightly above outer surfaces of the mount.

6. The ball stud system of claim 1, wherein the shoulder portion has a support surface that supports the washer and is oriented perpendicular to the longitudinal axis of the ball stud.

7. The ball stud system of claim 1, wherein an inner surface of the washer defines a central aperture therein and the inner surface is in contact with the pin portion.

8. The ball stud system of claim 1, wherein the shoulder portion has a generally constant outer diameter.

9. The ball stud system of claim 8, wherein the pin portion has a generally constant outer diameter which is smaller than the outer diameter of the shoulder portion.

10. A vehicle steering system comprising:
a steering knuckle;
a control arm; and
a ball joint between the steering knuckle and control arm, the ball joint comprising:
  a ball stud having a ball portion, shoulder portion and pin portion, structurally distinct from one another wherein the pin portion is at least partially threaded;
  a selectively removable tapered washer that is in contact with and fits around the pin portion and is supported on the shoulder portion of the ball stud and fits within a first tapered portion of the steering knuckle, wherein the shoulder portion has a support surface that supports the washer and is oriented perpendicular to the longitudinal axis of the ball stud;
  a tapered nut that fits into a second tapered portion of the steering knuckle and threadingly engages said pin portion to secure said ball stud to the mount; and
  a socket attached to the control arm that engages the ball stud in a manner allowing universal relative movement.

* * * * *